United States Patent [19]

Nagasaka et al.

[11] 4,212,629
[45] Jul. 15, 1980

[54] APPARATUS AND METHOD FOR LOCAL FORCED HEATING OF AN AUTO BODY

[75] Inventors: Yasumasa Nagasaka, Okazaki; Kenichi Sekiyama; Yasushi Masuyama, both of Toyota, all of Japan

[73] Assignee: Toyota Jidosha Kogyo Kabushiki Kaisha, Aichi, Japan

[21] Appl. No.: 923,911

[22] Filed: Jul. 12, 1978

[30] Foreign Application Priority Data

Nov. 8, 1977 [JP] Japan .............................. 52-133910

[51] Int. Cl.² .............................................. F24J 3/00
[52] U.S. Cl. .................................... 432/10; 432/225; 432/226; 432/227; 432/231
[58] Field of Search ................. 432/10, 225, 226, 227, 432/231

[56] References Cited

U.S. PATENT DOCUMENTS

| 3,389,896 | 6/1968 | Wilcox et al. | 432/10 |
| 3,980,126 | 9/1976 | Eberle | 266/68 |

*Primary Examiner*—John J. Camby
*Attorney, Agent, or Firm*—Oblon, Fisher, Spivak, McClelland & Maier

[57] ABSTRACT

Apparatus and method for local forced heating of an auto body characterized in that a joint build up with plastic solder on the steel plate of an auto body is placed under a hood which locally covers the joint; then a hot air blast is supplied to the hood. The hot air blast is evenly diffused by means of a stream-rectifying plate installed in the hood, and thus the built up plastic solder can be hardened through local forced heating.

5 Claims, 5 Drawing Figures

TEMPERATURE RISE BY HOT AIR BLAST HEATING
- --○--○-- → MAXIMUM TEMPERATURE PART OF PLASTIC SOLDER BUILDUP
- --●--●-- → MINIMUM TEMPERATURE PART OF PLASTIC SOLDER BUILDUP

TEMPERATURE RISE BY ULTRARED HEATING
- --△--△-- → MAXIMUM TEMPERATURE PART OF PLASTIC SOLDER BUILDUP
- --▲--▲-- → MINIMUM TEMPERATRE PART OF PLASTIC SOLDER BUILDUP

APPARATUS AND METHOD FOR LOCAL FORCED HEATING OF AN AUTO BODY

BACKGROUND OF THE INVENTION

1. Field of the Invention

The present invention relates to an apparatus for local forced heating of a joint on the steel plate of an auto body when the joint is reinforced with a buildup of plastic solder. More specifically, it relates to a heating apparatus for hardening to be used in the process of building up the joint on the steel plate of an auto body with plastic solder. The process comprises the four steps of pretreatment of the steel plate, building up by plastic solder spraying, hardening by heating, and grinding to a smooth finish.

2. Description of the Prior Art

In the conventional practice of heating plastic solder built up on a joint of steel plate, an ultrared heater has been used for local heating. This process has drawbacks, such as the temperature rise characteristic being easily affected by environmental conditions like atmospheric temperature or wind, the feedback control of temperature being difficult for an auto body being carried on a conveyor, or a wide variance occurring in the rate of temperature rise along the joint even when the heater arrangement is adjusted to change the watt density along the joint.

Also, in the conventional practice, even if a hot air blast is adopted for heating a joint, the hot air escapes and the efficiency of temperature rise is poor. Further, heating extends to unnecessary parts thereby burning the anti-rust oil applied to the auto body, and a wide variance occurs in the rate of the temperature rise.

Japanese Utility Model Applications Sho 51-158035 and Sho 51-122612 are typical examples of the conventional method and apparatus.

SUMMARY OF THE INVENTION

The primary object of the present invention is to provide an apparatus for local forced heating of auto body plate characterized in that the joint on an auto body steel plate is placed under a demountable hood fitting the auto body profile and a hot air blast means is provided in the hood to locally heat said joint with little escape of the hot air.

Another object of the present invention is to provide an apparatus for local forced heating of auto body plate characterized in that a stream-rectifying plate is provided in the hood to assure uniform heating of the joint.

Still another object of the present invention is to provide an apparatus for local forced heating of auto body plate characterized in that a joint on the auto body plate is placed under an auto body-contoured hood and hot air is blasted through the hood, thereby locally heating said joint with little escape of the hot air.

Still another object of the present invention is to provide an apparatus for local forced heating of auto body plate characterized in that a stream-rectifying plate is installed under the hood to assure uniform diffusion of hot air, thereby uniformly heating the joint on the steel plate.

BRIEF DESCRIPTION OF THE DRAWINGS

Various other objects and many of the attendant advantages of the present invention will be readily appreciated as the same becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENT

Figure 1:
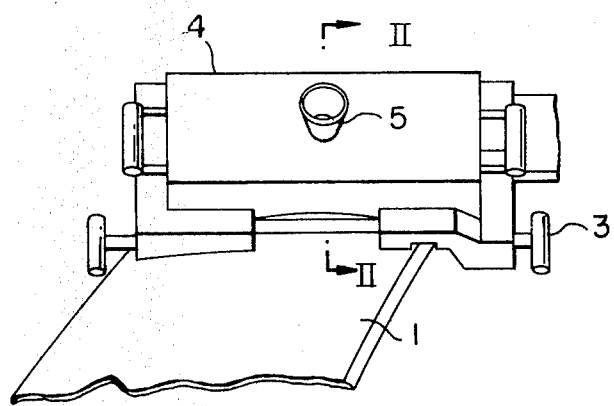
FIG. 1 is a front elevation view of an auto body local heating apparatus of one embodiment of the present invention.
Figure 2:
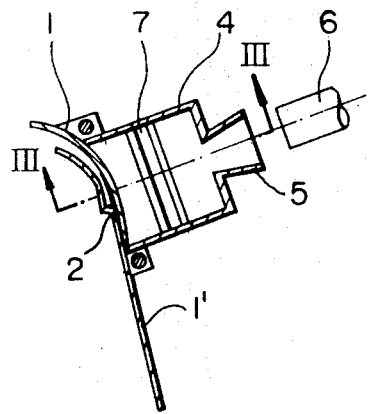
FIG. 2 is a section view along II—II of FIG. 1.
Figure 3:
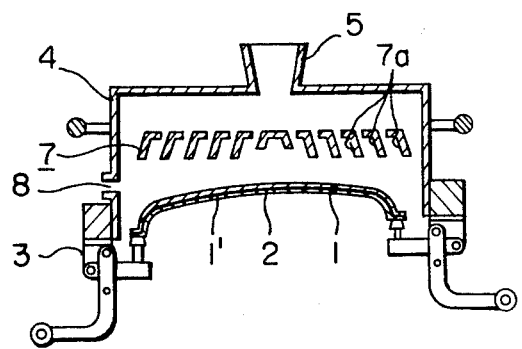
FIG. 3 is a section view along III—III of FIG. 2.

In FIGS. 1, 2, and 3, the auto body steel plates 1,1' to be reinforced are spot-welded and then built up by spraying with plastic solder 2. The joint of the plates 1,1' is then placed under the hood 4. The hood 4 is demountably fitted to the plates 1,1' at the locale of the joint by a fastener 3. As is seen from FIG. 2, the profile of the hood 4 has its ends following the contour of auto body to minimize the escape of hot air through the gap between the hood 4 and the auto body. The top of the hood 4 is made flat and a hot air intake 5 is provided approximately at the center of this flat top.

On the axis of the hot air intake 5 there is provided a hot air blast nozzle 6 to send the hot air into the hood 4 through the hot air intake 5.

Within the hood 4 there is provided a stream-rectifying plate 7 between said hot air intake 5 and the auto body steel plates 1,1'. Said stream-rectifying plate 7 is equipped with a plurality of blades 7a to diffuse the hot air supplied through the hot air intake 5 uniformly over the plastic solder buildup at the joint of the plates 1,1'. Downstream of said stream-rectifying plate 7 in the hood 4 there is provided a discharge hole 8 to allow the hot air which has passed over the stream-rectifying plate 7 to escape.

For the forced heating of the joint area built up with plastic solder 2 on the auto body steel plates 1,1' by the above apparatus, the hood 4 first is fitted to the relevant part of auto body by means of a fastener 3. The hot air blast nozzle 6 is then placed near the axis of the hot air intake 5 to send the hot air into the hood 4. The stream of hot air in the hood 4 is controlled by the stream-rectifying plate 7 and it heats the plate joint uniformly. In this way the joint is locally heated to the necessary temperature and the plastic solder built up on the joint is adequately hardened by heating. Most of the hot air which has heated the joint goes out through the discharge hole 8 and a part of it goes out through the gap between the hood 4 and the auto body steel plates 1,1'.

Figure 4:
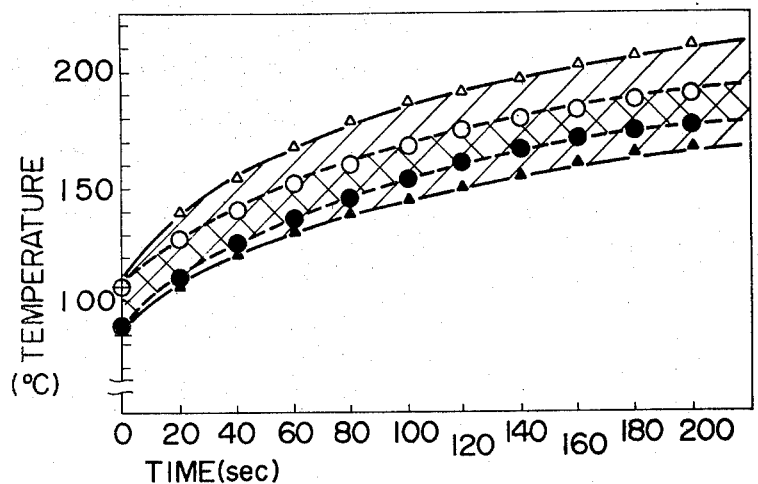
FIG. 4 is a diagram illustrating the comparative temperature rise characteristic of heating between hot air blasting according to the present invention and the conventional ultrared heating.
Figure 5:
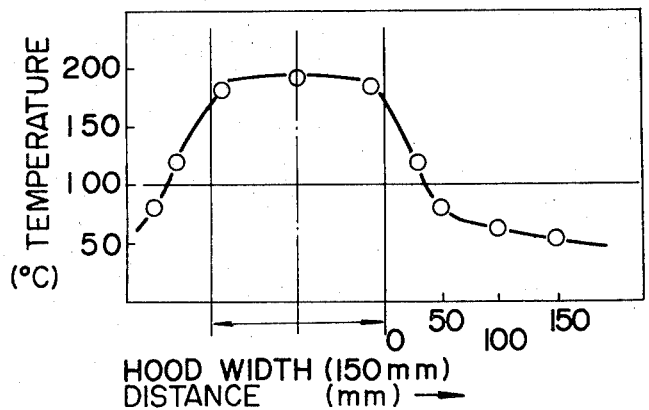
FIG. 5 is a diagram showing the temperature distribution in the II—II section of FIG. 1.

The results from heating tests on auto body steel plates by this apparatus are summarized in FIGS. 4 and 5. In FIG. 4, there is illustrated the temperature variance and the temperature rise characteristic of the present invention versus that of the conventional ultrared heater, which when shown together indicates that the temperature variance when the apparatus of the present invention is used is as little as about ±6° C.

From FIG. 5, illustrating the temperature distribution along II—II of FIG. 1, it is seen that the temperature within the hood 4 is practically uniform, while the temperature outside of the hood 4 suddenly drops, indicating that only the part under the hood 4 will be heated efficiently.

According to the present invention, the provision of a hood assures efficient heating since the hot air does not escape before reaching the plate joint, a speed-up of heating, a decrease in the cost of operation, and local heating of only the area to be heated. Meanwhile the presence of a hood contributes to the temperature stability by interfering with a disturbance such as lateral draft of air. Since the underside of the hood follows the contour of the auto body steel plate, the whole apparatus can be easily positioned.

Meanwhile, the provisions of a stream-rectifying plate and a discharge hole ensure uniform diffusion of hot air and thereby minimizing the variance in the heating temperature within the hood.

Moreover, provision of a separate hot air intake and hot air blast nozzle makes it possible to use a common supply source of hot air, and accordingly to apply the equipment to different models of vehicles.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for local forced heating of a moving auto body to heat and harden plastic solder built up on the joint of steel plates of the body, comprising:
    a hood adapted to move with said auto body and to cover the joint of auto body steel plates, the periphery of said hood follows the contour of the auto body and thereby minimizes the escape of hot air through the gap between the hood and auto body;
    a hot air intake provided on said hood;
    a hot air nozzle adapted to be removably axially positioned adjacent one side of said hot air intake;
    a stream-rectifying plate to control the hot air supplied through said hot air intake, said stream-rectifying plate being located between said hot air intake and the auto body, said stream rectifying plate being equipped with a plurality of blades to uniformly diffuse the hot air over the plastic solder built up on the joint of the steel plates;
    a discharge hole through which the hot air is driven from said hood, said discharge hole being located on the hood wall downstream of said stream-rectifying plate; and
    a fastener to demountably fit said hood to the auto body during the movement thereof.

2. The apparatus of claim 1, wherein said hood is adapted to locally cover the joint of the auto body steel plates.

3. The apparatus of claim 1, wherein said hot air intake is located at the center of the hood top.

4. A method for local heating of a moving auto body to joint at least two steel plates, comprising the steps of:
    placing a hood whose periphery follows the contours of said auto body to minimize the escape of hot air, over a joint of the steel plates which has built up with plastic solder and moving said hood with said auto body;
    sending hot air from a hot air blast nozzle axially removably positioned adjacent one side of said hood through a hot air intake located at the center of the hood top;
    uniformly diffusing the hot air sent into the hood by passing said hot air over a stream-rectifying plate equipped with a plurality of blades to uniformly diffuse the hot air over the plastic solder built up on the joint of the steel plates;
    uniformly heating the joint of steel plates with the hot air thus uniformly diffused, thereby to heat and harden said plastic solder; and
    discharging the used hot air through a discharge hole located on the hood wall downstream from said stream-rectifying plate.

5. The method of claim 4, wherein said hood is positioned to locally cover said joint of said steel plates.

* * * * *